United States Patent Office 3,532,760
Patented Oct. 6, 1970

3,532,760
REDUCTION OF CHLOROPHENONES
Charles E. Wymore, Midland, Mich., assignor to The Dow Chemical Company, Midland, Mich., a corporation of Delaware
No Drawing. Filed Aug. 15, 1966, Ser. No. 572,246
Int. Cl. C07c 29/16
U.S. Cl. 260—618                                      6 Claims

ABSTRACT OF THE DISCLOSURE

The hydrogenation of an o-chloroalkanoylbenzene such as o-chloroacetophenone and 2′,5′-dichloroacetophenone to the corresponding alcohol in the presence of a copper chromite catalyst promoted by an alkaline earth oxide or hydroxide is facilitated by the additional presence of an amine having an effective pKa value of at least 3.7.

---

This invention relates to an improved reduction process and it relates particularly to an improvement in the hydrogenation of certain chlorinated aromatic ketones to the corresponding carbinols.

Copper chromite is known to be an effective catalyst for the hydrogenation of a carbonyl group to the corresponding alcohol. Such reductions are customarily carried out under superatmospheric pressure and at elevated temperatures, for example, 100–200° C. The preparation of this catalyst and its activation for use are described in U.S. Pats. 2,544,756; 2,544,771; 2,575,403; and 2,575,-404. The composition of the active catalyst is not fully known, but it is believed to be essentially a mixture of copper chromites and copper oxide.

The activity of the catalyst is preferably stabilized by incorporation of a minor amount of a barium salt during its preparation. The barium is apparently chemically combined in the catalyst structure as a barium chromite. The term "copper chromite catalyst" is used in this specification and the appended claims to mean both the catalyst containing no barium and the barium-stabilized material. Although copper chromite, barium stabilized or no, is an effective catalyst for the hydrogenation of many carbonyl compounds, the reduction is often slow or incomplete for some chlorinated compounds and it has been found advantageous to use a combination of the catalyst with an added alkaline earth metal oxide or hydroxide for the reduction of these substances. This improvement is the subject of application Ser. No. 583,947 filed Oct. 3, 1966 and now abandoned owned by a common assignee and is not my invention. Even with such an additive, however, certain chlorinated carbonyl compounds remain somewhat resistant to hydrogenation with copper chromite catalyst.

More particularly, lower alkanoylbenzenes having chlorine substituents on the benzene ring are often slowly or incompletely hydrogenated in the presence of copper chromite catalyst, even though an alkaline earth metal oxide or hydroxide additive usually increases the rate of reduction. With ortho chlorinated alkanoylbenzenes such as o-chloroacetophenone and 2′,5′-dichloroacetophenone particularly, the reduction process is only moderately improved thereby and is still undesirably slow for some purposes.

It has now been found that in the hydrogenation of an o-chloro-lower alkanoylbenzene to the corresponding o-chloro-α-alkylbenzyl alcohol under superatmospheric pressure at an elevated temperature and in the presence of a copper chromite hydrogenation catalyst, the rate of hydrogenation is substantially improved by the additional presence in the reaction mixture of both an alkaline earth metal oxide or hydroxide and an amine having an effective pKa value of at least about 3.7. The term "alkaline earth metal" is used here and in the appended claims to mean calcium, barium, and strontium. By the term "effective pKa value" is meant the pKa value as normally determined minus 4 pKa units for each additional nitrogen atom in the amine molecule capable of forming a chelate ring and minus 2 units for each oxygen atom in a position to form a chelate ring. The value thereby derived appears to be a truer indicator of the actual basicity of the amine, at least in the present type of application. Standard pKa values are determined in aqueous solution, usually at 25° C.

Such amines are heterocyclic amines, for example, pyridine, quinoline, morpholine, piperazine, piperidine, and lower alkyl derivatives thereof such as picolines and lutidines, tert-butylpyridine, N-methylmorpholine, 2,5-dimethylpiperazine, and the like; aniline and its nitrogen and ring-substituted lower alkyl derivatives; alkylenediamines of 2–6 carbon atoms such as ethylenediamine and 1,6-hexanediamine; monoalkanolamines and dialkaolamines of 2–8 carbon such as ethanolamine, diethanolamine, propanolamine, diethylamino-2-propanol, bis(hydroxybutyl)amine, and the like; and primary, secondary, tertiary aminoalkanes, i.e., alkylamines, dialkylamines, and trialkylamines wherein the alkyl groups are of 1–20 carbon atoms including butylamine, dodecylamine, trilaurylamine, dioctylamine, dimethyldodecylamine, and the like. Mixtures of these amines can be used.

Since the reduced product is usually most conveniently separated by distillation from the reaction mixture, the amine used is preferably sufficiently high boiling to remain in the distillation residue. The amine can be used in the form of its acid salt, for example, its hydrochloride or hydrogen sulfate, for such a salt is converted to the free amine by the alkaline earth base in the reaction mixture.

Surprisingly, both such a base and the amine are necessary to obtain the benefits of this invention. An excess of amine alone provides little or no increase of reaction rate. Similarly, the combination of an amine as defined with another kind of base such as sodium hydroxide either gives no improvement or has an adverse effect on the reduction.

The quantities of alkaline earth metal base and amine are not critical, for so long as a significant quantity of each is used, some improvement in reduction rate is obtained. For best results, about 1–15% of alkaline earth base and 0.01–5% of amine based on the weight of alkanoylchlorobenzene are employed. No additional advantage is ordinarily obtained by use of more than about 0.5 percent of amine.

The present process is advantageously applied not only to the hydrogenation of o-chloro-lower alkanoylbenzenes alone but also to the hydrogenation of mixtures of the ortho chlorinated isomer with its meta and para chlorinated isomers or with the dichlorinated material. For example, this method gives markedly improved results when applied to the reduction of a mixture of ortho and para chloroacetophenones or a mixture of o-chloroacetophenone with 2′,5-dichloroacetophenone.

The process of this invention is particularly adapted to the reduction of o-chloro-lower alkanoylbenzenes of the formula:

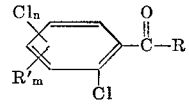

wherein R is an alkyl group of 1–3 carbon atoms, R′ is lower alkyl, lower alkoxy, or chlorine, and $m$ and $n$ are individually zero or one. Compounds represented by the above formula include o-chloroacetophenone, 2′,5′-dichloroacetophenone, 2'4' - dichloro - 3'-methylacetophenone, 2'-chloro-4'-methoxypropiophenone, 2',4'-dichloropropiophenone, and 2'-chlorobutyrophenone.

The following examples describe the practice of the invention. In these experiments, the degree of reduction was measured by the fall in hydrogen pressure from the initial value at the reaction temperature to the pressure at the end of the run at the same temperature. In most cases, the reduction was continued until essentially all of the carbonyl group had been converted to the alcohol. By plotting the pressure against time for each reduction, the time when reduction was 50% complete could be taken from the resulting curve and this figure, called the half time value, is used in the examples to indicate the relative rate of reduction as compared to rates found in similar runs. Although some dechlorination occurred in all reductions and thereby contributed to the pressure drop, this side reaction was substantially constant in rate and degree, amounting usually to about 5% of the chlorine present, and it did not seriously affect the accuracy of the relative rate determinations. A commercial barium-stabilized copper chromite catalyst was employed in Examples 1–15.

EXAMPLES 1–13

The reduction was carried out in a stainless steel rocking autoclave of about 180 ml. volume adapted for high pressure operation and equipped with automatic means for temperature control and pressure measurement. A 0.75 inch steel ball in the autoclave provided agitation of the contents when the autoclave was rocked. A mixture of 59.5 of o-chloroacetophenone, 3 g. of commercial barium stabilized copper chromite catalyst, 5.9 g. of calcium hydroxide, and 0.3 g. of trilaurylamine was put in the autoclave which was then closed, evacuated of air, and pressured with hydrogen. The catalyst used in these and following experiments had previously been activated by heating at about 175° C. in a mixture of 90% α-phenethyl alcohol and 100% acetophenone.

The autoclave was rocked at 150° C. and an initial hydrogen pressure of 950 lbs. gauge until 88.8% of the theoretical reduction had occurred, total time 5.8 hours. The time for 50% reduction or half time, calculated as described above, was 66 minutes. When the above procedure was repeated twice, each time omitting the trilaurylamine from the reaction mixture, the half times found were 165 and 169 minutes respectively.

Additional runs were made as described in the example using the same quantity of an amine other than trilaurylamine. The increase in the rate of reduction of o-chloroacetophene to o-chloro-α-phenethyl alcohol obtained by the use of each amine is expressed in the following table as per cent decrease in half time, using the average value of 167 minutes from the blank runs as a standard.

TABLE

| Example Number: | Amine | Half time decrease, percent |
|---|---|---|
| 1 | Trilaurylamine | 67 |
| 2 | N-Methylaniline | 48 |
| 3 | Pyridine | 62 |
| 4 | Quinoline | 47 |
| 5 | Piperazine | 56 |
| 6 | Piperidine | 67 |
| 7 | Morpholine | 74 |
| 8 | Ethanolamine | 49 |
| 9 | Diethanolamine | 46 |
| 10 | Butylamine | 47 |
| 11 | Diethylamine | 75 |
| 12 | Ethylamine hydrochloride | 37 |
| 13 | Dimethyldodecylamine | 48 |

In contrast to these results, amines such as diphenylamine, tris(hydroxymethyl)aminomethane, imidazole, pyrazole, m-chloroaniline, and triethanolamine had either no significant effect or an adverse effect on the reduction rate when used as described above. These amines have effective pKa values of 0.8, 2.07, 295, <2.48, 3.52, and 1.76 respectively. Using 0.3 g. of imidazole in the reaction mixture, for example, only about forty per cent of the theoretical reduction was obtained after running for sixteen hours. Imidazole has an effective pKa value of 2.95 (6.95–4).

EXAMPLE 14

A series of runs was made under the general conditions of Examples 1–13 but using a reaction mixture of 59.5 g. of o-chloroacetophenone, 5.9 g. of the copper chromite catalyst, 3 g. of calcium hydroxide, and a quantity of trilaurylamine as noted.

| | | Half Time | |
|---|---|---|---|
| | Amine, g. | Minutes | Percent decrease |
| Run: | | | |
| A | 0 | 151 | |
| B | 0.06 | 116 | 23 |
| C | 0.3 | 72 | 52 |
| D | 1.5 | 80 | 47 |

No further advantage was found on using a quantity of amine greater than 0.3 g. or 0.5% based on the weight of chloroacetophenone.

EXAMPLE 15

Using the apparatus and general procedure of the foregoing examples, a mixture of 50 g. of 2',5'-dichloroacetophenone, 3 g. of copper chromite catalyst, 6 g. of calcium hydroxide, and 0.3 g. of trilaurylamine was contacted with hydrogen at an initial gauge pressure of 950 lbs. and a temperature of 150° C. After 19 hours, 93.6% of the starting material had been reduced to the alcohol. When the above procedure was followed omitting the amine from the reaction mixture, only 70% of the theoretical reduction was found after running for 69 hours.

Improved reduction rates were also found in experiments similar to those of Examples 1–13 when the copper chromite catalyst was employed in conjunction with calcium oxide plus triethylamine and with barium hydroxide plus trilaurylamine respectively. In each case, significantly faster reduction was obtained as compared to like experiments where the amine was omitted from the reaction mixture. In similar experiments where an amine additive was employed in the absence of an alkaline earth base, little or no increase in reduction rate was noticed.

By the procedure of the foregoing examples, the rate of hydrogenation of other ortho-chlorinated alkyl aryl ketones to the corresponding carbinols is increased by the use of an amine and an alkaline earth oxide or hydroxide with copper chromite catalyst. In this way, the copper chromite catalyzed reduction of 2'-chloro-4'-methylacetophenone to the alcohol is facilitated by the presence of both calcium hydroxide and trilaurylamine, 2'-chloro-4'-methoxybutyrophenone is thereby more rapidly reduced to 1-(2-chloro-4-methoxyphenyl)-1-butanol, and 2',4'-dichloropropiophenone is advantageously reduced in the same way to 1-(2,4-dichlorophenyl)-1-propanol.

Similar improvement in the rate of hydrogenation of ortho chlorinated alkanoylbenzenes was provided by the present process when a copper chromite catalyst containing no barium was substituted for the barium stabilized catalysts used in the foregoing examples.

I claim:
1. In a reduction process wherein an o-chloro-lower alkanoylbenzene of the formula:

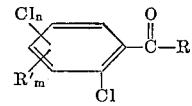

wherein R is an alkyl radical of 1–3 carbon atoms, R' is a lower alkyl, lower alkoxy, or chlorine radical, and $m$ and $n$ are each zero or one is converted to the corresponding o-chloro-α-alkylbenzyl alcohol by contacting with hydrogen under superatmospheric pressure at 100–200° C. and in the presence of a copper chromite hydrogenation catalyst and at least one of an oxide or hydroxide of an alkaline earth metal, the improvement wherein said reduction is accelerated by the additional presence of at least one amine having an effective pKa value of at least 3.7, selected from the group consisting of pyridine, quinoline, morpholine, piperazine, piperidine, and lower alkyl derivatives thereof; aniline and lower alkyl derivatives thereof; monoalkanolamines and dialkanolamines of 2–8 carbon atoms; alkylenediamines of 2–6 carbon atoms, and monoalkylamines, dialkylamines, and trialkylamines wherein the alkyl groups are of 1–20 carbon atoms.

2. The process of claim 1 wherein the alkaline earth metal compound is calcium hydroxide.

3. The process of claim 1 wherein the o-chloro-lower alkanoylbenzene is o-chloroacetophenone.

4. The process of claim 1 wherein the o-chloro-lower alkanoylbenzene is 2′,5′-dichloroacetophenone.

5. The process of claim 2 wherein the amine is a trialkylamine.

6. The process of claim 5 wherein the amine is trilaurylamine.

References Cited

UNITED STATES PATENTS

| | | |
|---|---|---|
| 2,544,756 | 3/1951 | Guest et al. |
| 2,544,771 | 3/1951 | Young et al. |
| 2,575,403 | 11/1951 | Young et al. |
| 2,575,404 | 11/1951 | Guest et al. |
| 3,051,753 | 8/1962 | Dietzler et al. _____ 260—580 |
| 3,067,253 | 12/1962 | Dietzler et al. _____ 260—575 |
| 3,145,231 | 8/1964 | Kosak _____ 260—580 |
| 3,213,145 | 10/1965 | Field. |
| 3,366,695 | 1/1968 | Lundeen. |
| 3,374,184 | 3/1968 | McEvoy et al. |

LEON ZITVER, Primary Examiner

N. P. MORGENSTERN, Assistant Examiner

U.S. Cl. X.R.

260—613